Oct. 13, 1925.
E. D. WILLIAMSON
TREE CARRIER
Filed Feb. 19, 1925
1,556,659
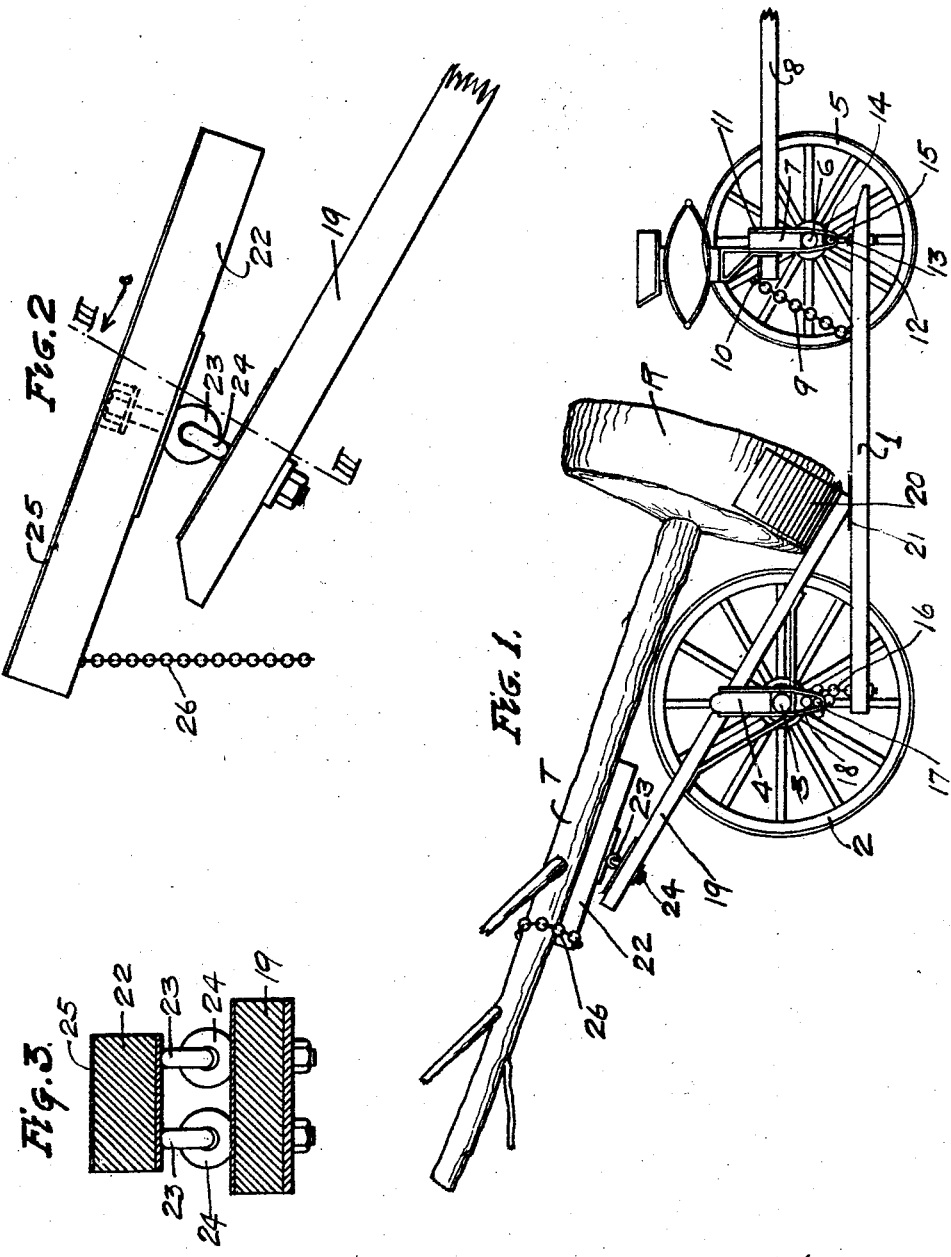
INVENTOR.
Edgar D. Williamson
BY
J. H. Weatherford
ATTORNEY.

Patented Oct. 13, 1925.

1,556,659

UNITED STATES PATENT OFFICE.

EDGAR D. WILLIAMSON, OF MEMPHIS, TENNESSEE.

TREE CARRIER.

Application filed February 19, 1925. Serial No. 10,376.

*To all whom it may concern:*

Be it known that I, EDGAR D. WILLIAMSON, a citizen of the United States, residing at Memphis, in the county of Shelby and the State of Tennessee, have invented certain new and useful Improvements in Tree Carriers, of which the following is a specification.

The present invention relates to tree carriers and consists in the combination and arrangement of parts hereinafter described and particularly set forth in the claims.

The invention has for its purpose to provide a vehicle for transporting trees which are to be transplanted in such a manner that the bulk of the earth naturally adhering to the roots of the tree may be carried to the place of replanting and the trunk of the tree so supported as to avoid likelihood of mutilating the bark.

The present invention is an improvement of my tree carrier Patent No. 1,235,624 and has especial reference to an improvement in means for supporting the trunk of the tree so that as far as possible mutilation will be avoided.

I find in preparing trees for transportation that it is impossible to cut the roots of the tree absolutely uniform in length; that the size of the trunks vary; that the trunks are not necessarily straight and that these and other factors make it impossible to design a fixed rest for the trunk of the tree against which the trunk will lay firmly and to which the trunk may be secured so that it will not chafe and be subject to having the bark mutilated during transportation. This feature of my device has long been a source of worry and expense and has caused much damage which by the present device I am able to avoid.

A further object of my invention therefore, is to provide means against which the tree trunk may rest firmly and solidly and to which it may be firmly attached, so that this damage may be avoided.

I accomplish these objects as will be more fully hereinafter set out in the drawings, specification and claims.

In the drawings:

Fig. 1 is a side view of a tree carrier with a tree in place thereon with the wheels on the side from which the carrier is viewed, removed.

Fig. 2 is an enlarged side view of the trunk supporting block showing the method of attachment and its relation to the beam of the tree supporting member.

Fig. 3 is a sectional view on the line III—III of Fig. 2 looking in the direction of the arrow.

Referring now to the drawing in which the various parts are indicated in all the views by numerals. 1 designates the body or bed of a wheeled carrier. 2, 3 and 4 the rear wheels, axle and bolster respectively. 8 is the vehicle tongue which is securely attached to the front bolster 7. 9 is a chain which is secured to the body 1 near the front end thereof which chain may be engaged with a hook 10 secured to the rear end of the tongue 8 for lifting the front end of the body. After this body has been lifted to position, it is supported in such position by means of straps 11 embracing the front bolster 7 and depending therebelow terminating in the lower loops 12. 13 is a bolt secured to the front end of the body member 1, which bolt has an eye 14 through which eye and the loops 12, the bolt 15 may be passed after the body has been raised. The rear end of the body 1 is raised by means of the chain 16 which is wrapped around the shaft 17 supported in similar depending loops 18 secured to the rear bolster 4. The detail of this portion of the mechanism being as already shown in my previous patent.

The tree support or carrier comprises a beam 19 adapted to be carried, after raising, in an upwardly and rearwardly inclined position to the end that the upper portion and the trunk of the tree will be clear of the ground while under transportation and for convenience of the movement of the vehicle. Disposed on and secured to the lower end of the beam 19 is a curved cradle 20. Preferably this cradle is a curved plate of such dimension and radius as to embrace the root portion "R" of the tree with the earth adhering thereto. 21 is a metal plate mounted on the body 1 which provides a suitable base for the end of the beam 19 and thereby avoids any likelihood of injury to the said body, as will be understood. The support for the trunk "T" of the tree comprises a supporting block 22 disposed with its length in the direction of the length of the beam 19 and hinged securely thereto, by means of engaging eye bolts 23—24 fastened respectively in the said block and the beam 19, preferably two sets of these bolts being used.

The bolts 24 may be passed entirely through the beam 19, but the bolts 23 are preferably countersunk so that there is no projection beyond the upper surface of the block 22. 25 is a metal plate preferably used to protect the top of the block 22 against wear. 26 is a chain secured to the block 22 which chain is used for the purpose of securing the tree trunk "T" to the said block.

It will readily be seen from the foregoing, that when a tree is placed in this tree supporting frame with its root section in the cradle 20, that the trunk "T" of the tree will rest solidly against the block 22 and that irrespective of the diameter of the root section or the size or curvature of the trunk "T" this block will adjust itself to the proper angle so that a substantial length of the trunk of the tree will rest thereagainst with no possibility of a corner of the block cutting into and bruising the bark of the tree as has previously often happened.

It is obvious that those skilled in the art may vary the details of construction and arrangement of the supporting block and the hinge therefor, without departing from the spirit of my invention and the form of hinge is therefore introduced largely for illustrative purposes without thereby limiting my invention except as may be required by the claims.

Having now fully described my invention, what I claim and desire to secure by Letters Patent in the United States is:—

1. In a tree carrier, having raising and carrying means, a tree supporting frame comprising a beam adapted to be carried in an upwardly and rearwardly inclined position, a root and earth embracing cradle at the lower end of said beam, and a trunk supporting member, comprising a block, means hinging said block to the upper end of said beam and tree fastening means attached to said block and movable therewith.

2. In a tree carrier having raising and carrying means, a tree supporting frame, comprising a beam adapted to be carried in an upwardly and rearwardly inclined position, a root and earth embracing cradle at the lower end of said beam, and a trunk supporting member, comprising a block disposed with its length in the direction of the length of said beam, means hinging said block to the upper end of said beam and tree fastening means attached to said block.

3. In a tree carrier, having raising and carrying means, a tree supporting frame, comprising a beam adapted to be carried in an upwardly and rearwardly inclined position, a root and earth embracing cradle at the lower end of said beam and a trunk supporting member comprising a block, eye bolts attached to said block, eye bolts attached to said beam, and engaged with said first bolts to form a hinge for said block, and tree fastening means attached to said block.

In testimony whereof I have hereunto set my name.

EDGAR D. WILLIAMSON.